United States Patent [19]
McNabb et al.

[11] Patent Number: 5,931,925
[45] Date of Patent: Aug. 3, 1999

[54] SYSTEM AND METHOD FOR EFFICIENTLY TRANSFERRING DATASTREAMS IN A MULTIMEDIA SYSTEM

[75] Inventors: Daniel Lloyd McNabb, Los Gatos, Calif.; Scott Lyon Porter, Austin, Tex.; James Christopher Wyllie, Monte Sereno, Calif.

[73] Assignee: International Business Machines Corporation, Armonk, N.Y.

[21] Appl. No.: 08/755,866

[22] Filed: Dec. 2, 1996

[51] Int. Cl.$^6$ ........................................... G06F 13/28
[52] U.S. Cl. .................. 710/52; 710/22; 709/237
[58] Field of Search ..................... 395/872, 875, 395/892, 842, 200.33; 710/22, 52, 55, 72; 709/203, 237

[56] References Cited

U.S. PATENT DOCUMENTS

| | | |
|---|---|---|
| 5,161,226 | 11/1992 | Wainer . |
| 5,291,608 | 3/1994 | Flurry . |
| 5,341,479 | 8/1994 | Lowell ................................ 395/200.33 |
| 5,404,536 | 4/1995 | Ramakrishnan et al. . |
| 5,481,719 | 1/1996 | Ackerman et al. . |
| 5,802,288 | 9/1998 | Ekanadham et al. .................... 395/872 |

OTHER PUBLICATIONS

Ron Minnich et al., The Memory–Integrated Network Interface, IEEE, pp. 11–20, Dec. 1995.

Moti N. Thadani et al., An Efficient Zero–Copy I/O Framework for Unix, Sun Microsystems Laboratories, Inc., pp. 1–19, May 1995.

Shaw et al., Unix Internals, A Systems Operations Handbook, McGraw Hill, Chapters 11, 12, Glossary, pp. 83, 97–99, 115–129, 131–140, 193–197, Dec. 1987.

*Primary Examiner*—Zarni Maung
*Assistant Examiner*—Patrice L. Winder
*Attorney, Agent, or Firm*—Robert M. Carwell

[57] ABSTRACT

A multimedia datastreaming system includes one of a plurality of differing pre-existing file systems each supporting a set of zero copy function interfaces. A method is provided for supporting the zero copy function of a datastream file with the pre-existing file system. A general purpose file system interface is established to the pre-existing file systems. The general purpose file system interface is then invoked to affect zero copy transfer of the datastream from a producer module to a consumer module. An initial prefetch of data associated with the datastream file is initiated in response to an I/O command issued from a multimedia file system daemon, such prefetch being from mass storage to a buffer in shared memory in an interrupt context.

18 Claims, 3 Drawing Sheets

SYSTEM AND METHOD FOR EFFICIENTLY TRANSFERRING DATASTREAMS IN A MULTIMEDIA SYSTEM

TECHNICAL FIELD

This invention relates to computerized multimedia servers and, more particularly, to techniques for efficiently transferring datastreams in such systems between devices such as from a disk storage subsystem to a network or video decoder card.

BACKGROUND OF THE INVENTION

Multimedia systems typically involve a number of datastreams representing highly dense multimedia data which must be transferred extremely efficiently through the system. A representative example is "video-on-demand" server system. Various methods have been devised for attempting to efficiently move the data through these systems. Many of these systems utilize as their operating system the familiar Unix operating system or a derivative thereof, typically found in client-server environments such as those which implement multimedia content delivery systems. An inherent and seriously defective aspect of such Unix-based systems is that the mechanisms employed therein for moving data are not optimized for efficiency as is required in systems involving highly complex multimedia datastreams.

The video coupling subsystem (VCS) of the invention, to be hereinafter described in greater detail, provides a producer/consumer framework for transferring data between producer and consumer devices in an extremely efficient manner within such Unix or Unix-derivative kernel environments. Traditional methods have employed copying of such data from the kernel to user space and then back again to the kernel. Moreover, such systems involve a great deal of CPU overhead associated with context switches. For a Multimedia File System (MMFS) in which the multimedia data resides to act as a producer within a zero copy framework (employed for efficiency because of its avoidance of copying of data and lessened CPU overhead) such an MMFS must supply buffers of data to be transferred within an interrupt context at an interrupt level. However, this presents a serious problem in that file system operations (such as those associated with Unix-based systems), normally must run in a process context rather than an interrupt context.

Additional problems presented by conventional subsystems in order to effect efficient transfer of multimedia datastream information gave rise to innovations in the invention including finding and locking buffers at an interrupt level, communicating prefetch information to a daemon process utilized to prefetch buffers of file data in advance of when they are needed at the interrupt level, handling serialization with concurrent writer to the file, and more generally, devising a general purpose file system interface to support zero copy in a VCS framework.

In order to more fully understand the contributions and nuances of the invention, it will first be helpful to provide a generalized description of basic components and modules in a multimedia system such as that depicted in FIG. 1.

In accordance with the invention a "zero copy" or video coupling subsystem "VCS" 48 is provided for moving data between the file system 22 and the network or video decoder cards without having to copy the data from kernel to user space. While this VCS has been shown in the depiction in FIG. 1 of a conventional system so that it may clearly be seen where it fits in such a system, it is actually an aspect of the novel contributions of the invention. It will accordingly be described in greater detail with respect to the Description of the Invention. As such, the combination of the various subsystems including the file system, data exporter, VCS, and NARs will hereinafter be referred to more generally as the data pump subsystem 14A driven by a control server 14B, in turn driven by an application server I/O.

In an effort to address the previously described problems, it has been known to attempt to effect a zero-copy mechanism by developing separate subsystems in order to manager the buffers which transfer data from mass storage to a consumer device. Such an approach however, has been extremely problematic and relates to the reason why data is brought into shared memory in the first place, e.g., to effect timely management of data so as to provide an efficient mechanism for transferring it while avoiding copying of the data and associated CPU overhead.

In these systems, it has been conventional to effectively export this function (management of the shared data) to separate custom-designed new modules which themselves must solve the problem of effecting the correct sharing of data. Accordingly, a mechanism was highly sought after wherein the necessary control and buffering knowledge could remain with the original file system. In this manner any current policies associated with the data control and buffering already implemented in the pre-existing file system could be advantageously maintained.

SUMMARY OF THE INVENTION

A general purpose interface is provided to a file system of a multimedia server to improve datastream throughput. The file system includes an export registration service providing function pointers to the file system's implementation of a defined set of zero copy interfaces. These interfaces include an initialization service to set up necessary data structures and to place use counts on objects to prevent them from being removed while zero copy operations are in progress. A termination service is further provided in the zero copy interfaces to clean up data structures and to remove use counts. A service is further provided to validate that a specified file is suitable to be used in zero copy operations. A service is additionally provided to find and record file attributes needed to later acquire buffers at interrupt level. A data structure is defined to hold these attributes for subsequent calls. A service is provided to lock a buffer at an interrupt level and to return the amount of data present, and to provide addressability to the buffer in another address space context. A data structure is defined to hold these buffer attributes for subsequent calls. A service is additionally provided to unlock the buffer at interrupt level. Finally, a service is provided to provide information on changes to the access pattern of the file such as would be needed to support VCR functions.

A hash chain employing a singly linked list which is updated atomically is used to allow the lookup operation for the buffer to be performed safely at interrupt level. A compare-and-swap form of locking is used on the buffer to allow this operation to be performed at interrupt level. A mailbox interface suitable for use at interrupt level is implemented to provide prefetch and release information to the daemon. This interface replaces the standard IPC method such as message queues which is not usable from interrupt level. To handle "load-and-play" operations where a file is being imported from tape or some other external device while concurrently being delivered to an output device, locking is performed on just the buffer rather than on both the file and the buffer. To detect cases where the reader catches up to the writer, the number of bytes provided in the buffer is used as an indication of end of file (EOF).

Employing the foregoing techniques, in a normal case a buffer may be provided to an output device with no data copying and with no context switching. However, in cases where a lock collision or where the buffer is not available (e.g., was stolen), the system and method herein described also provides for acquiring the buffer in a process context. In the video coupling subsystem (VCS) framework, a kproc procedure is provided to retry an operation should it fail while running at interrupt level. Because some operations require multiple steps and some of these may have completed at interrupt level prior to failing, additional state information is recorded so that the retry only performs the remaining work to be completed.

DETAILED DESCRIPTION OF THE PREFERRED EMBODIMENT

Figure 1:
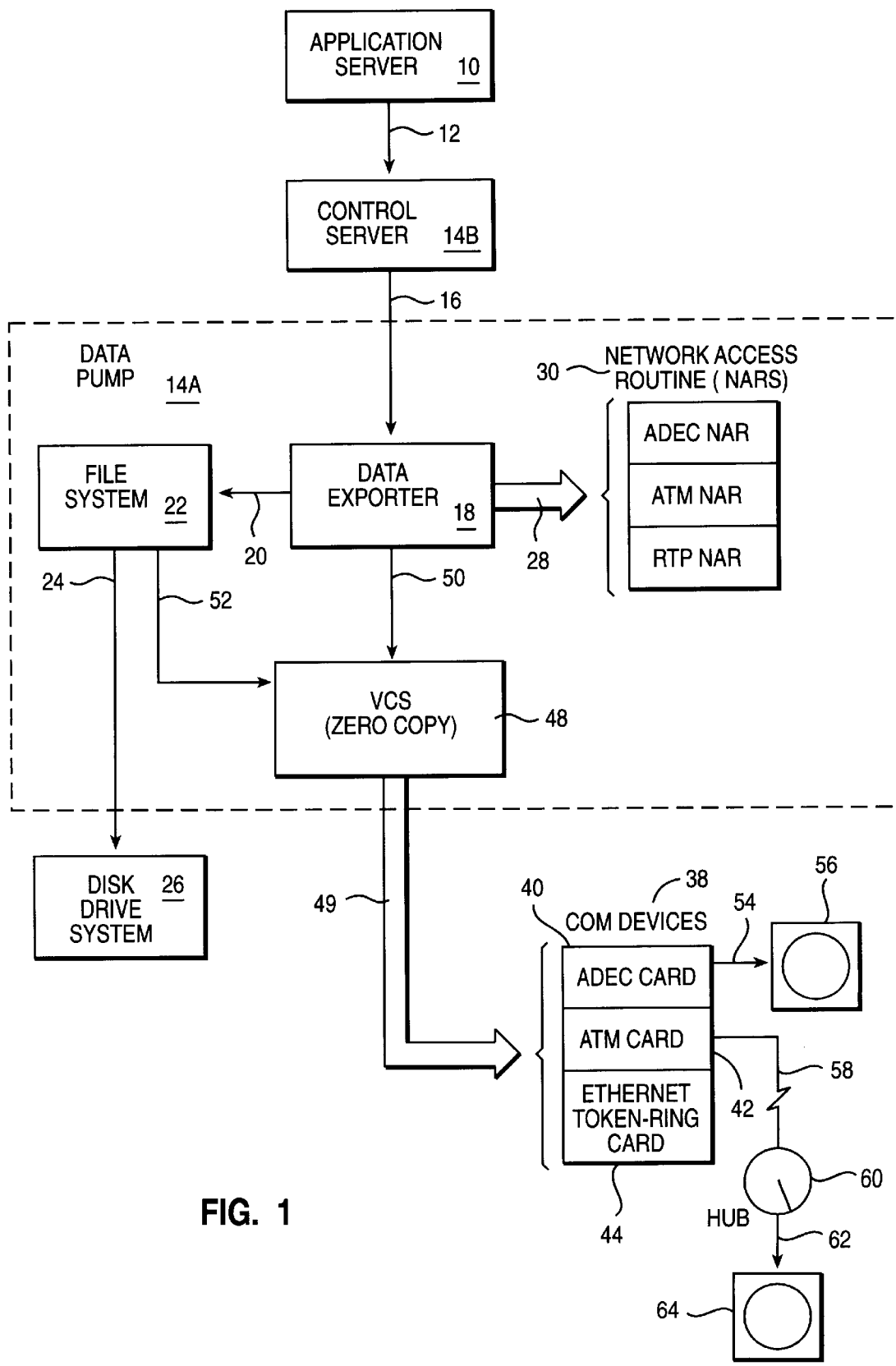
FIG. 1 is a functional block diagram of a conventional multimedia datastream system.

Referring again to FIG. 1, it will be recalled that a zero copy or VCS subsystem 48 was included in order to indicate how this function fits in with the various components of a more conventional system. The data exporter 18 previously described essentially will establish a coupling between the disk drive 26 and file system 22 and the video decoder card such as ADEC 40. Put more generally, the exporter 18 provides a way of interconnecting in a pipeline fashion for efficient datastream transmission, producer and consumer devices. Once a connection has been established, the data exporter 18 by control 50 to the VCS 48 provides a connection in order to control data flow directly between the file system 22 and the communication devices 40 through the VCS.

Figure 2:
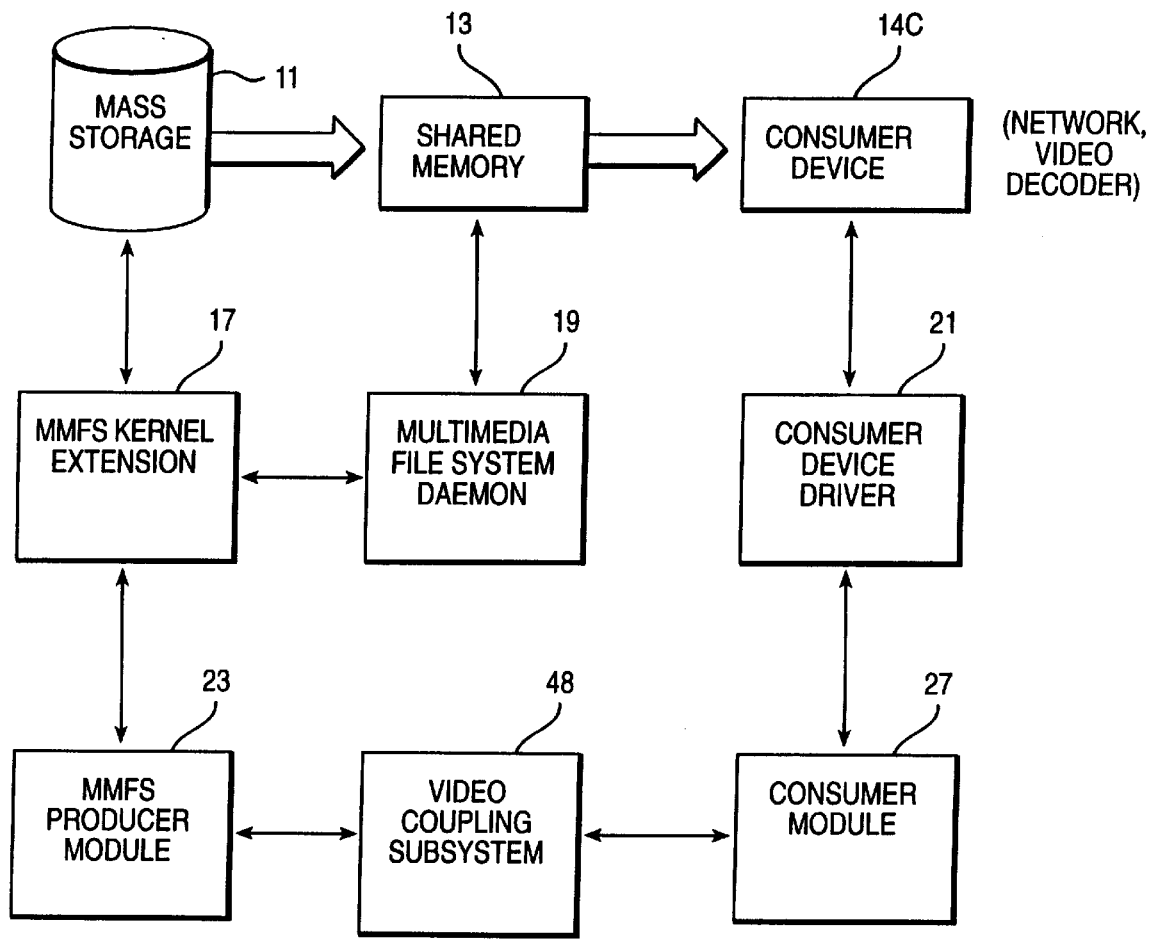
FIG. 2 is a block diagram of a multimedia datastream server system of the invention, including a more detailed illustration of some of the components of FIG. 1 and additional components comprising the invention.

Turning now to FIG. 2, the general function of the video coupling subsystem 48 (shown as VCS 48 in FIG. 1) is to control the data flow between the multimedia file system (MMFS), producer module 23 and the consumer module 27 in an optimal manner. An example of a consumer module might be a video decoder comprised of, for example, an ADEC NAR 30 and corresponding ADEC adapter card 40 (FIG. 1) essentially the output side of the pipe. An example of this producer module 23 with reference to FIG. 1 is a storage subsystem such as a disk drive system 26 and file system 22 which may in part be embodied in a plurality of conventional disk drives or a RAID array, for example. The producer module 23 acts as an intermediary between another file system which may be of pre-existing conventional design such as file system 22 and the VCS 48. The VCS itself provides a set of interfaces for managing the flow of data, and the producer module 22 essentially acts as an intermediary fielding requests from the VCS 24 and making appropriate calls into the file system 22 to get the requested data. In FIG. 2, the mass storage 11 corresponds to the disk drive subsystem 26 shown in FIG. 1. The MMFS kernel extension 17 and MMFS daemon 19 are embodied in the file system 22 of FIG. 1.

Still referring to FIG. 2, the kernel extension 17 obviously is in the kernel of the operating system executing on the system of FIG. 1 whereas the daemon 19 is executing in application space. This explains why the flow of control is from the VCS 48 to the producer module 23 to the kernel extension 17 to the daemon 19—the VCS, producer module, and kernel extension are within the kernel and communicate out to the user level represented by the daemon in the application space, 19.

A fundamental aspect of the subject invention is to achieve the necessary transfer of multimedia data without incurring the overhead of having to copy it. It has been known to be able to transfer data between devices without bringing the data into memory. An example of a related technique is the "zero-copy" technique such as that outlined in the published paper entitled "An Efficient Zero-Copy I/O Framework for Unix", M. N. Thadani et al, Sun Microsystems Laboratories, Inc., SML1 TR-95-39, 5/95. In this approach protocols are available between devices employed on the bus to facilitate the actual transfer of data between devices without the need to involve the processor of the system or bringing the data into memory.

In a video server environment it may be of interest to bring the data into memory because if two users desire to play the same title for example, these multiple requests may be satisfied from a single copy in memory, (whereas if this same data was simply moved between devices the data would have to be physically moved twice). Accordingly, it is of interest to be able to use the buffering properties of memory in a video server environment wherein two users may be desiring to access the same data. The model of the subject invention is based upon the assumption that the data will brought into memory and a single copy of the data is desired, and the choice fundamentally is to have the file system 22 provide that single copy.

File systems conventionally run in a process context. In this context a conventional way to move data in the file system is to do a "read" system call from a user level program into the kernel to get a particular range of data from a file read from disk into a kernel buffer, and then to copy it out to the user buffer. If it was desired to write data to the network on the other hand, a "write" system call would be issued and data would be transferred from user memory back into the kernel and from the kernel buffer to the network device.

One problem addressed by the invention relates to the model which a Video Coupling Subsystem 48 may support. More particularly, a system was needed which could operate within a Unix or Unix-derivative environment (such as the AIX (TM) operating system of the IBM Corporation) in a manner which could limit CPU overhead and the overhead associated with the copying of data. Most of the control flow performed by a VCS between a producer and consumer module 23, 27, occurs within an interrupt context. However, in the Unix and Unix-derivative operating system environments, there are significant constraints on the operations which can be performed in the interrupt environment as opposed to a process context in which file systems normally run. The VCS 48 of the invention is essentially replacing the conventional write model with a model which performs data transfer entirely within the kernel.

At this point, an example may serve to illustrate how data would be transferred in a zero-copy method in accordance with the invention. Once the VCS 48 establishes a pipeline between the producer module and the consumer module 27 and the data flow is commenced, the VCS would make a request to the producer module 23 instructing it to obtain a buffer of data. The producer module 23 would access the file system 22 to perform a lookup to locate the buffer of data and provide addressability to that buffer within the kernel context over to the consumer module 27. Therefore, instead of actually copying data, a reference to the data is thereby being provided. The consumer module 27, when it needs to pass the data to an output device like the video decoder card 40 of FIG. 1, would actually therefore be referencing the copy of the data which the file system 22 already has.

Continuing with FIG. 2, the mass storage 11, shared memory 13, and consumer device 14C were separated out together at the top of FIG. 2 in order to show the control flow, e.g., that when the file system is involved, the data is being transferred from the mass storage 11 (or the disk drive subsystem 26 of FIG. 1) into shared memory 13, and that the shared memory 13 is managed by the file system 22. The video coupling subsystem 48 provides the consumer device 14C a reference to that data in the shared memory 13. Accordingly we end up with one copy in the shared memory 13 and the data is transferred from the mass storage 11 to the consumer device 14C. The consumer device 14C maps to the local device on the server, e.g., the network or video decoder which in turn would deliver digital data to the consumer or analog data over a cable length through a high bandwidth ATM switch or the like.

Figure 3:
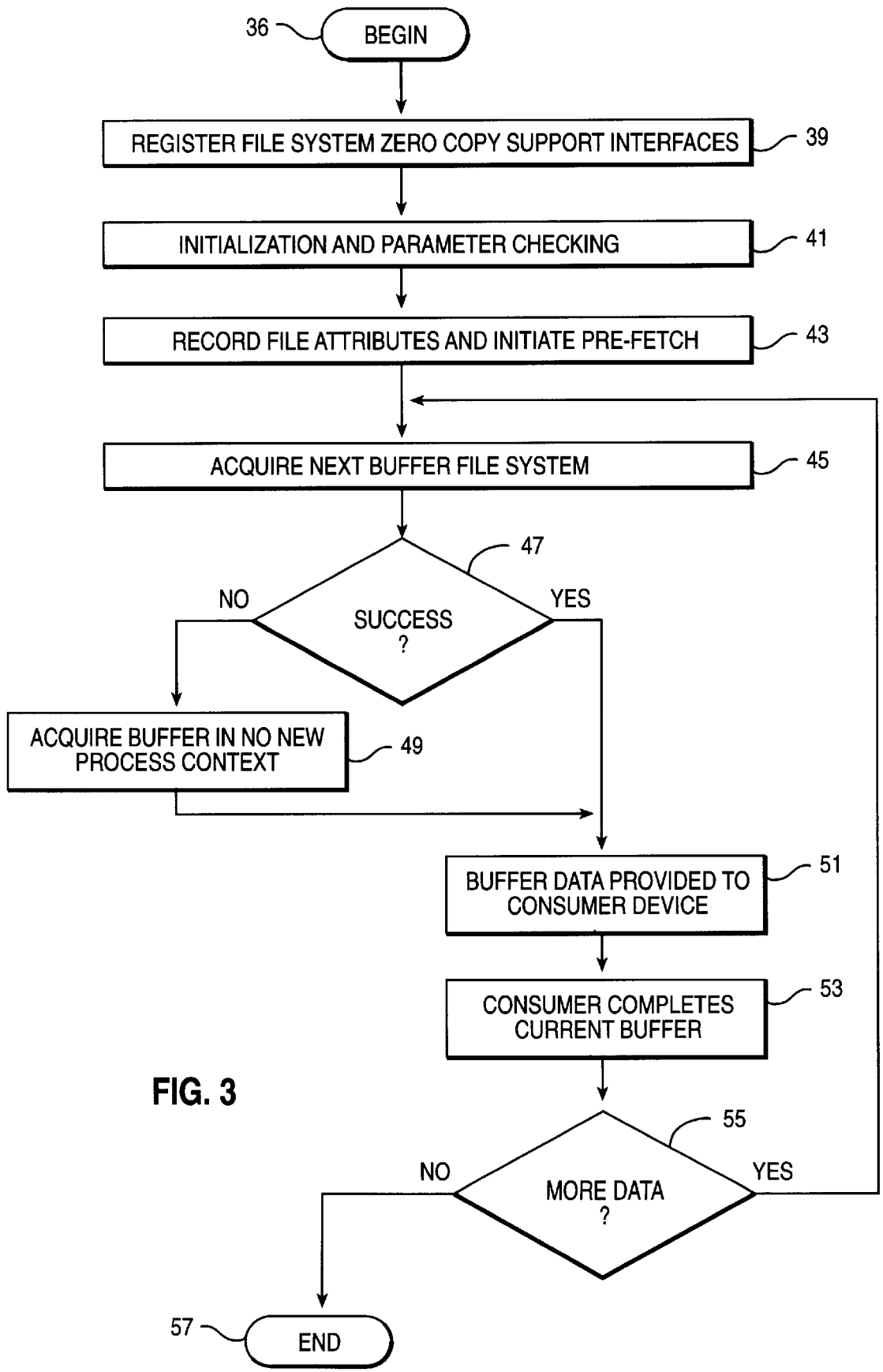
FIG. 3 is a flow diagram which may be implemented in program code executing on the system of FIG. 2 in order to implement the invention.

Turning now to FIG. 3, depicted therein is a flow diagram which preferably would be implemented in program code executing on the system of FIG. 2 so as to implement the invention. More particularly, the code primarily executes in the producer module 23. To set the framework for the explanation of FIG. 3, the VCS 48 and its associated components are kernel extensions of the operating system for the system of FIG. 2 which dynamically get loaded. Accordingly, the initial steps of FIG. 3 occur at the point where the producer module 23 is loaded into the kernel of the operating system, which in turn occurs when the video subsystem is started. When the producer module 23 gets loaded, it calls into an exported service provided by the kernel extension 17 that is basically a registration service. The producer module 23 makes a request of the kernel extension 17 service to indicate the addresses of the functions that the extension provides to support the zero copy functionality. After the process begins and the producer module 23 is loaded, shown at step 36, this step just described at block 39 occurs, e.g., the file system zero-copy support interfaces supported by the kernel extension 16 are registered.

It is significant to note that it is an important feature of the invention that a generic interface has thereby been provided for support of this zero-copy function. In the alternative, and less desirably, a special purpose interface could have been provided specifically limited to a particular pre-existing multimedia file system. However in accordance with the invention, in providing a more generalized set of kernel services, they may be employed by a variety of differing file systems in the zero-copy framework. These file systems are registered with the producer module 23. More particularly, in response to this call from the module 23, the kernel extension 17 provides back to the producer module 23 a set of function descriptors so that the producer module can later make function calls to the kernel extension 17. The aforementioned step occurs as part of the configuration of the producer module 23.

The next phase of operation of the video coupling subsystem functionality, with continued reference to FIG. 3, occurs when the producer module 23 is actually called by the VCS 48 to do some initialization and provide the parameters (e.g., the file within the pre-existing multimedia file system) from which the VCS desires to obtain data. Accordingly, the producer module 23 will perform some initialization of its data structures and will do parameter checking of the file which was passed to it to ensure that it actually is a multimedia file from the multimedia file system and not a file from some other file system such as a journaled file system (JFS). This initialization and checking stage, 41, of FIG. 3 also represents that the producer module 23 has formed further checking to ensure that the file passed to the producer module 23 satisfies any other criteria required to permit the file to participate in zero-copy operations. Some of the parameters which are passed through for performing a zero-copy operation include the offset in the file at which it is desired to start the copy, the length of the data desired, etc. Accordingly the parameter checking, step 41, is to make sure that the file corresponds to the starting offset and ending offset from which it is desired to obtain data, etc.

Continuing with FIG. 3, before data transfer actually starts, the producer module 23 will call into the pre-existing multimedia file system (specifically to the MMFS kernel extension 17) to extract information related to the file that will later allow data from that file to be retrieved within this interrupt context.

As previously described, normally in a Unix or Unix-derivative environment, most file system operations, e.g., reads and writes, of data to or from the file system occur within a process context. What has to occur to permit data transfers in file systems is to be able to acquire all of the information needed to effect the transfer, e.g., information regarding the file, buffers to support transferring of the data from an interrupt context, etc. The associated data structures such as inodes and indirect blocks are generally and conventionally accessible in a process context but not in an interrupt context. Referring to FIG. 3, the step 43 in part is intended to indicate that these attributes about the file necessary to effect data transfer are recorded at this step and saved away in a file handle or other appropriately designated data structure, e.g., attributes are saved away which, when the system gets to the actual transfer of data, will allow such data to be located from an interrupt context.

Yet an additional function occurs at step 43, referred to as initiating prefetch. A communication from the producer module 23 to the kernel extension 17 will indicate to the file system that it is necessary to prepare data for the file to be transferred. Features and design points pre-existing in a multimedia file system supporting continuous delivery of multimedia data may be advantageously employed to support the features of the invention in providing for zero-copy mechanisms in an interrupt environment. More particularly, such a file system will preferably include the ability to retrieve data from the mass storage 11 and to deliver it to shared memory 13 prior to when the data is actually required by the consumer device 14C.

With the foregoing in mind, the meaning of the "initiate prefetch" portion of step 43 may now be better understood. This initial prefetching essentially "primes" the shared memory 13 with an initial portion of data of the file prior to the actual start of flow of data to the consumer device 14C. The control flow regarding this prefetch is from the producer module 23 to the kernel extension 17 to the daemon 19. It is this daemon which will issue I/O requests from the mass storage which results in the prefetched data being placed in the shared memory 13. When the actual start of transfer of data is later begun, it will start from the point where such prefetched data is already available in the shared memory 13.

Continuing with FIG. 3, at step 45 the next buffer of the file system is acquired. In the steps which follow, the process essentially enters a loop whereby for every buffer of data associated with the file being transferred, successive such buffers will be transferred from the producer to the consumer until the desired amount of data which was requested has been transferred.

Accordingly, when the video coupling subsystem 48 indicates that the system is ready to do I/O (e.g., transfer of data is about to occur from the producer to the consumer), the VCS 48 will issue a function call to the producer module 23 which in turn calls into the kernel extension 17 for a particular file offset to determine where in shared memory 13 the buffer of data is located which corresponds to that file system. In a particular Unix-derivative utilized in the preferred embodiment described herein, e.g., the AIX operating system, a "cross memory descriptor" is provided which allows differing pieces of code to obtain addressability to the same portion of memory which potentially may be in different contexts, e.g., either process or interrupt contexts. Being passed a file description and description of the file offset, the kernel extension 17 still must examine the multimedia file system data structures to determine which of the buffers in shared memory 13 actually corresponds to that particular file and file offset. Once the kernel extension has determined this, the kernel extension will provide the aforementioned cross memory descriptor (e.g., the reference to the correct buffer), and this descriptor is returned to the producer module 23 and back to the VCS 48 and is eventually passed to the consumer module 27.

At this point the consumer module 27 therefore has a reference to the correct buffer in the shared memory 13 which can now be passed to the standard device driver, whether it be a device driver associated with a network or video decoder, such device driver being shown at block 21. With the reference to the appropriate buffer or portion of memory 13 which has been passed to the device driver 21 from the consumer module 14C, the driver can now effect standard operations such as AIX DMA or other operations well known in the art to get the data moved out of shared memory 13 into the consumer device 14C.

Continuing with FIG. 3, at block 45, wherein the file system next buffer is acquired, the producer module 23 calls into the kernel extension 16 and the operations the kernel extension performs must be done carefully. What follows is more detail of a particular implementation of the invention so as to effect this. A hash chain employing a singly linked list which is updated atomically is utilized to permit the lookup operation for the buffer to be performed safely at an interrupt level. When the buffer of data is acquired by the shared memory, the buffer is locked, utilizing a compare-and-swap form of locking to serialize with other file system operations that may be occurring. In an interrupt context, care must be taken regarding the particular form of locking employed. The compare-and-swap form of locking selected in the implementation described is significant in that this form of locking, well known in the art, will function within the interrupt context that the kernel extension 16 is operating in.

Another important aspect of the implementation herein described needs further explanation. Because the file space itself is split between the kernel extension 16 and the user space daemon portion 19, a communication method is needed between these components 17–19, which also operates within the interrupt context. Normal interprocess communication (IPC) methods such as System 5 shared memory or other standard IPC mechanisms such as message queues only operate from within a process context or level. Accordingly, the invention provides for a mailbox interface form of communication between components 17–19, utilizable at the interrupt level to permit intercommunication between the kernel extension and the daemon in the interrupt environment for supporting zero-copy in order to provide for the aforementioned prefetch and release information to the daemon 19.

Once a buffer has been acquired, 45, there are undesirable conditions within the interrupt context wherein the process goes to acquire a buffer of file data, the buffer may not exist for some reason, conflicting locks on the buffer may exist, or some other set of reasons may exist as to why that buffer acquiring operation will not succeed within an interrupt context. In such an event, the process will fall back to a more conventional buffer acquisition in a process context. Thus a test performed at block 47 (which might indicate that an attempt in block 43 to acquire a file system next buffer failed) would result in flow to block 49. The step in block 49 represents that the same operation (to acquire the file system next buffer) would occur utilizing steps associated with a normal process context to determine which buffer is involved, to obtain addressability to it, and the like. Thus within the VCS 48, provision is made for a separate kernel process to be used to handle operations which cannot otherwise be performed for whatever reason in the interrupt context.

Once the next buffer has been successfully obtained (either in the interrupt context, 45, or utilizing the normal process context, 49), flow continues to block 51. At this point the buffer has been acquired as well as addressability to it in the shared memory 13 from the file system. Block 51 indicates that once this occurs, this particular buffer data is then provided to the consumer device 14C. This actually involves the substeps of passing control back to the VCS 48, through to the consumer module 27. It will be recalled that the consumer module 27 has the cross memory descriptor or reference to the data to be transferred from the memory 13. A standard AIX device driver or other standard device driver in the case of other Unix systems can use to cause the transfer of data from the memory 13 to the device 14C.

Once the consumer device 14C has transferred all of the data in the current buffer to the device 14C, the consumer device 14 (by an interrupt or other suitable mechanism) will instruct the device driver 21 that this operation has been completed of transferring the current buffer to the device 14C. The device driver 21 will then communicate back to the consumer module 27 that this data move has been completed. The consumer module 27, in response, will pass control back to the VCS 48. The VCS, in turn, will then inform the producer module 23 that the I/O, (e.g., the transfer of data from the memory 13 to device 14C in the current buffer) has completed and that the system is ready for additional buffer transfers.

Thus, at step 53 in FIG. 3, this step indicates that the consumer device 14C has in fact completed transfer of the current buffer in the shared memory 13. Once this notification of the transfer has been made, any lock or other information indicating the buffer is in use needs to be updated, e.g., the block will be released or the like. In addition, however, a further prefetch message is then sent from the producer module 23 through the path of the kernel extension 17 to the daemon 19 to effect the fetch of the next buffer ahead of where the consumer device 14C is, (i.e., at a location in the file being transferred logically adjacent the data previously just-transferred in the buffer just released). In this manner, the system preserves the state wherein data is always available in the shared memory 13 by the time the consumer device 14C is in need of it. This prefetching contributes to the quality of service requirement whereby avoidance of dropped frames for example is achieved.

Continuing with FIG. 3, at block 55, a check is made to determine whether yet additional buffers remain of data associated with the file to be transferred. If in fact the end of the data has not been reached, the process loops back to block 45 to repeat the previously described steps with reference to blocks 47, 55. When all such data has been transferred, tested at block 55, the process ends at 57 and a return is issued indicating the data transfer has completed.

While the invention has been shown and described with reference to particular embodiments thereof, it will be understood by those skilled in the art that the foregoing and other changes in form and detail may be made therein without departing from the spirit and scope of the invention.

We claim:

1. For use in a multimedia datastreaming system having one of a plurality of differing pre-existing file systems each supporting a set of zero copy function interfaces, a video coupling system (VCS) interconnecting a producer module and a consumer module, mass storage interconnected to shared memory, a consumer device, a multimedia file system daemon, and a device driver disposed between said consumer device and said consumer module, a method for supporting said zero copy function of a datastream file with said pre-existing file system, comprising:

establishing a general purpose file system interface to said plurality of differing pre-existing file systems comprising establishing an export registration service comprised of a multimedia file service kernel services extension, with said pre-existing file system registered with and callable by said producer module, said export registration service producing function descriptors to said export registration service, said pre-existing file system, and to said zero copy function interfaces;

invoking said general purpose file system interface to effect zero copy transfer of said datastream from said producer module to said consumer module;

issuing a function call from said producer module to said export registration service to obtain said function descriptors invocable by said producer module to call said kernel extensions;

calling said producer module with said VCS to cause said producer module to verify said datastream file is subject to said zero copy function;

calling said kernel services extension from said producer module to obtain identity of buffers supporting data transfers from an interrupt context whereby said datastream is located in said mass storage and retrievable within an interrupt context;

recording file attributes of said datastream file in response to said calling of said kernel services extension from said producer module;

transferring an indicator from said producer module to said kernel services extension indicating said system is ready to prepare data associated with said datastream file to be transferred from said mass storage to buffers in said shared memory; and initiating an initial prefetch of data associated with said datastream file, said initial prefetch being in response to an I/O command issued from said daemon and from said mass storage to a buffer in shared memory in an interrupt context.

2. The method of claim 1 further including:

generating a function call from said VCS to said producer module indicating said system is ready for I/O from said buffer in said shared memory to said consumer device.

3. The method of claim 2 further including:

generating a function call from said producer module to said kernel services extension for a file descriptor and offset for a next buffer of said data in said mass storage.

4. The method of claim 3 further including:

examining said multimedia file system by said kernel services extension to determine a correct buffer in said shared memory to be output to said consumer device in response to said I/O call.

5. The method of claim 4 further including:

generating a cross memory descriptor corresponding to said correct buffer with said kernel services extension.

6. The method of claim 5 further including:

delivering said cross memory descriptor sequentially from said kernel services extension to said producer module to said VCS, and to said consumer module.

7. The method of claim 6 further including:

receiving said cross memory descriptor by said driver; and transferring said data in said correct buffer in shared memory to said consumer device by said driver in response to said received cross memory descriptor.

8. The method of claim 7 further including:

checking to determine if said datastream file is not adapted for transfer in an interrupt context; and acquiring a buffer of data from said file in a process context in response to said checking.

9. The method of claim 8 further including:

establishing a mailbox interface between said kernel extension and said daemon in an interrupt context.

10. An apparatus for use in a multimedia datastreaming system having one of a plurality of differing pre-existing file systems each supporting a set of zero copy function interfaces, a video coupling system (VCS) interconnecting a producer module and a consumer module, mass storage interconnected to shared memory, a consumer device, a multimedia file system daemon, and a device driver disposed between said consumer device and said consumer module, a method for supporting said zero copy function of a datastream file with said pre-existing file system, comprising:

means for establishing a general purpose file system interface to said plurality of differing pre-existing file systems comprising means for establishing an export registration service with said pre-existing file system registered with and callable by said producer module, said export registration service being comprised of a multimedia file service kernel services extension producing function descriptors to said export registration service and said pre-existing file system, and to said zero copy function interfaces;

means for invoking said general purpose file system interface to effect zero copy transfer of said datastream from said producer module to said consumer module;

means for issuing a function call from said producer module to said export registration service to obtain said function descriptors invocable by said producer module to call said kernel extensions;

means for calling said producer module with said VCS to cause said producer module to verify said datastream file is subject to said zero copy function including means for initializing data structures and checking parameters including starting and ending offset and length of said datastream file associated with said datastream file;

means for ensuring that said datastream file is a multimedia file;

means for calling said kernel services extension from said producer module to obtain identity of buffers supporting data transfers from an interrupt context whereby said datastream file is located in said mass storage and retrievable within an interrupt context;

means for recording file attributes of datastream said file in response to said calling of said kernel services extension from said producer module;

means for transferring an indicator from said producer module to said kernel services extension indicating said system is ready to prepare data associated with said datastream file to be transferred from said mass storage to buffers in said shared memory; and means for initiating an initial prefetch of data associated with said datastream file, said initial prefetch being in response to an I/O command issued from said daemon and is from said mass storage to a buffer in shared memory in an interrupt context.

11. The apparatus of claim 10 further including:

means for generating a function call from said VCS to said producer module indicating said system is ready for I/O from said buffer in said shared memory to said consumer device.

12. The apparatus of claim 11 further including:

means for generating a function call from said producer module to said kernel services extension for a file descriptor and offset for a next buffer of said data in said mass storage.

13. The apparatus of claim 12 further including:

means for examining said multimedia file system by said kernel services extension to determine a correct buffer in said shared memory to be output to said consumer device in response to said I/O call.

14. The apparatus of claim 13 further including:

means for generating a cross memory descriptor corresponding to said correct buffer with said kernel services extension.

15. The apparatus of claim 14 further including:

means for delivering said cross memory descriptor sequentially from said kernel services extension to said producer module to said VCS, and to said consumer module.

16. The apparatus of claim 15 further including:

means for receiving said cross memory descriptor by said driver; and means for transferring said data in said correct buffer in shared memory to said consumer device by said driver in response to said received cross memory descriptor.

17. The apparatus of claim 16 further including:

means for checking to determine if said datastream file is not adapted for transfer in an interrupt context; and means for acquiring a buffer of data from said file in a process context in response to said checking.

18. The apparatus of claim 17 further including:

means for establishing a mailbox interface between said kernel extension and said daemon in an interrupt context.

* * * * *